United States Patent [19]
Zinnkann et al.

[11] Patent Number: 5,823,639
[45] Date of Patent: Oct. 20, 1998

[54] PISTON PUMP FOR DELIVERING HYDRAULIC FLUID IN A BLOCK-PROTECTED VEHICLE BRAKING SYSTEM

[75] Inventors: Ulrich Zinnkann, Koblenz; Helmut Gegalski, Mülheim-Kärlich, both of Germany

[73] Assignee: Lucas Industries public limited company, United Kingdom

[21] Appl. No.: 637,799

[22] PCT Filed: Dec. 16, 1994

[86] PCT No.: PCT/EP94/04186

§ 371 Date: May 2, 1996

§ 102(e) Date: May 2, 1996

[87] PCT Pub. No.: WO95/16859

PCT Pub. Date: Jun. 22, 1995

[30] Foreign Application Priority Data

Dec. 17, 1993 [DE] Germany ............................. 9319462 U

[51] Int. Cl.⁶ ................. F04B 21/02; B60T 8/32
[52] U.S. Cl. ................. 303/116.4; 417/549; 417/273
[58] Field of Search .................. 303/116; 417/549, 417/552, 554, 569

[56] References Cited

U.S. PATENT DOCUMENTS

| | | | |
|---|---|---|---|
| 2,521,164 | 9/1950 | Hayes | 417/273 |
| 4,113,323 | 9/1978 | Haney | 303/116.4 |
| 4,730,879 | 3/1988 | Adachi et al. | 303/116.4 |
| 5,213,482 | 5/1993 | Reinartz et al. | 303/116.4 |
| 5,232,273 | 8/1993 | Eckstein et al. | 303/116.4 |
| 5,505,530 | 4/1996 | Kramer et al. | 303/116.4 |

FOREIGN PATENT DOCUMENTS

| | | |
|---|---|---|
| 0637690A1 | 2/1995 | European Pat. Off. . |
| 1379727 | 10/1964 | France . |
| 3236536A1 | 4/1984 | Germany . |
| 3742824A1 | 7/1989 | Germany . |
| 4027794A1 | 3/1992 | Germany . |
| 2253882A | 9/1992 | United Kingdom . |

Primary Examiner—Matthew C. Graham
Attorney, Agent, or Firm—Wood, Herron & Evans, L.L.P.

[57] ABSTRACT

A piston pump for the delivery of hydraulic fluid, in particular for ABS braking systems, comprises a pump housing 10 with an inlet 12 and an outlet 14 for the hydraulic fluid. A piston 16 is guided in the pump housing 10 without a sliding sleeve and supplies hydraulic fluid from the inlet 12 to the outlet 14 of the housing 10. A valve assembly 20 together with the piston 16 and a return spring 34 for the piston is joined as an asseembly capable of being handled independently and arranged directly in the pump housing 10.

14 Claims, 3 Drawing Sheets

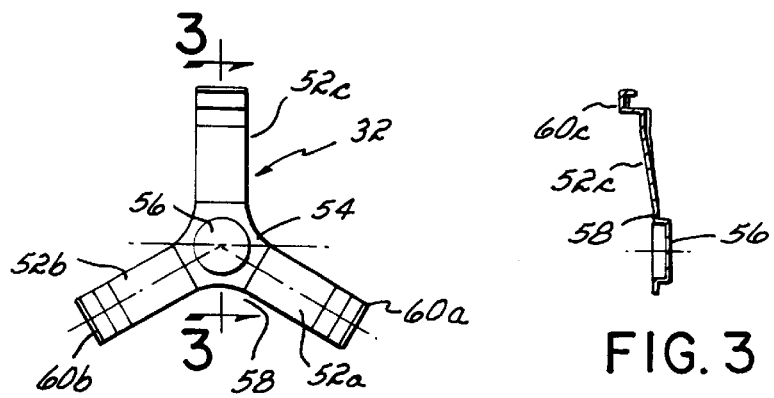
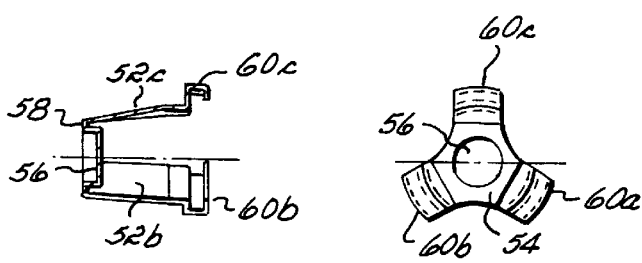
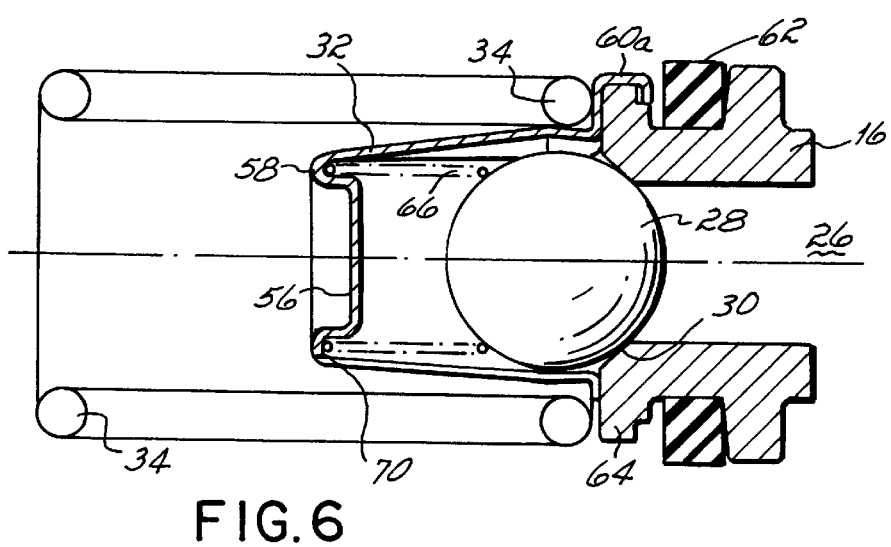
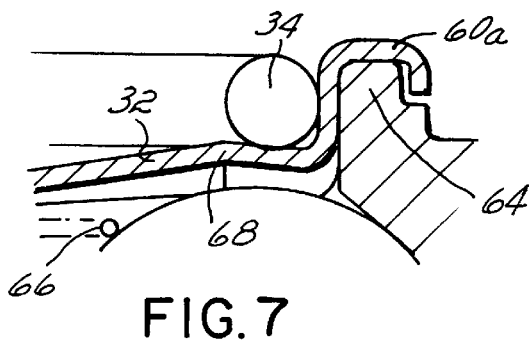

PISTON PUMP FOR DELIVERING HYDRAULIC FLUID IN A BLOCK-PROTECTED VEHICLE BRAKING SYSTEM

FIELD OF THE INVENTION

The invention relates to a piston pump for delivering hydraulic fluid, particularly in a block-protected vehicle braking system.

BACKGROUND OF THE INVENTION

When using such a pump in a block-protected braking system (ABS) and/or an anti-slip control (ASC) system of a vehicle, its purpose is to supply hydraulic brake fluid to the master cylinder and/or the vehicle wheel brakes, in order to achieve a braking action within the ABS or ASC control cycles in a known manner.

In such piston pumps according to the state of the art, the intake and outlet valves are generally arranged in the longitudinal axis of the pump. These pumps are referred to as radial piston pumps. A piston performs working strokes along the longitudinal axis of such a pump in order to supply the hydraulic fluid towards the brake of the vehicle. In accordance with the state of the art, the piston is accommodated in a sliding sleeve which is securely connected with the pump housing, and the intake and outlet valves are usually arranged on the longitudinal axis of the pump. This state of the art is known from DE-A-32 36 536, DE-A-37 42 824 and DE-A-40 27 794.

SUMMARY OF THE INVENTION

In the case of this state of the art, the piston, the intake valve and a return spring for the piston must each first be installed in a sliding sleeve which keeps the components together. The sliding sleeve with said installed parts can then be inserted as a sub-assembly into the housing of the valve. Such a design of the piston pump is intricate with respect to the number of components and their assembly.

The invention is based on the object of further developing a piston pump of the initially mentioned type in such a manner that the effort required for manufacturing and assembly is reduced.

According to the invention, this object is solved in that certain parts of the piston pump are designed in such a way that they can be connected with each other prior to assembly in the pump in such a manner that they form an assembly which is capable of being handled independently. In order to form this assembly, the piston as well as individual parts of the valve are preferably taken into consideration. The return spring which biases the piston towards a drive unit can also be added to the assembly which is connected with the piston prior to installation in the pump by means of a positive connection.

The invention also makes it possible to reduce the manufacturing and assembly effort for a piston pump in that the sliding sleeve which is used in the state of the art is omitted and instead of which the piston and the valve assembly are capable of being installed directly in the pump housing. The "direct" installation of said parts in the pump housing means that no special sliding sleeve is arranged between the piston and the valve assembly and the housing which encloses these parts. This inventive solution of said object does not necessarily imply that the piston, the return spring and the valve assembly have been connected to form an independently handable assembly prior to installation in the piston pump.

It is preferably intended to have the assembly (consisting of at least the piston, the valve assembly and the return spring, if required) connected by means of a part of the valve assembly.

The component which permits the connection of the assembly is preferably a shaped sheet metal part of the valve assembly.

The inventive handling of the components piston, intake valve and return spring as an independent subassembly of the piston pump is advantageous in that an easy and primarily position-independent assembly is possible, because this subassembly can be inserted directly into the pump body (housing) without prior installation in a sliding sleeve and without a certain positioning of the housing.

The connection of said components to one another is preferably effected by means of positive connections and elastic engagement of the parts into each other.

The design of the component which connects said parts as a shaped sheet metal part is advantageous in that such a shaped sheet metal part can be made by means of a punching or bending process. Through holes for the hydraulic fluid can be provided directly in the shaped sheet metal part through a corresponding shape of the sheet metal part. The shaped sheet metal part preferably serves as a spring cage of the valve assembly. In the case of the state of the art, such spring cages are usually manufactured by means of a deep drawing process or a die casting process, and the through holes for the hydraulic fluid must be made in an additional operation, which increases the manufacturing effort and thus the costs.

The above-mentioned inventive measures not only enable simplification of manufacturing and assembly of the piston pump, but, in addition, also simplification of the disassembly of the piston pump because fewer parts have to be removed and removal is further simplified in that several of the components can be removed from the piston pump in a connected condition as an independently handable assembly.

In another preferred embodiment the piston and the shaped sheet metal part are designed in such a manner that the shaped sheet metal part is positively retained by the piston. This can be achieved, for example, by a radially projecting collar or retaining rim which is positively embraced by the shaped sheet metal part.

In an advantageous embodiment, the piston comprises at least one seal at its circumference which seals the piston against a hole in the housing, in which the piston is guided in a slidably movable manner. For this purpose, the piston is preferably provided with a shoulder which accommodates the seal, with the seal in the assembled condition being biased by the return spring towards the shoulder. If the shaped sheet metal part has several arms, of which at least one is angled in a radial direction (outwardly or inwardly) at its free end, these free ends can press the seal onto the shoulder of the piston under the biasing force of the return spring. This results in a stable and secure seat of the seal on said shoulder.

In the following an embodiment of the invention will be explained in more detail with reference to the drawing, in which:

BRIEF DESCRIPTION OF THE DRAWINGS

FIG. 2 shows a plan view of a shaped sheet metal part for use in a piston pump according to FIG. 1 before its final forming operation;

FIG. 3 shows a section along line A—A in FIG. 2;

FIG. 4 shows a side view of a finished formed sheet metal part;

FIG. 5 shows an axial plan view of a shaped sheet metal part according to FIG. 4;

FIG. 6 shows a detail according to FIG. 1 in an enlarged scale;

FIG. 7 shows a detail from FIG. 6 in an enlarged scale; and

DETAILED DESCRIPTION OF THE DRAWINGS

Figure 1:
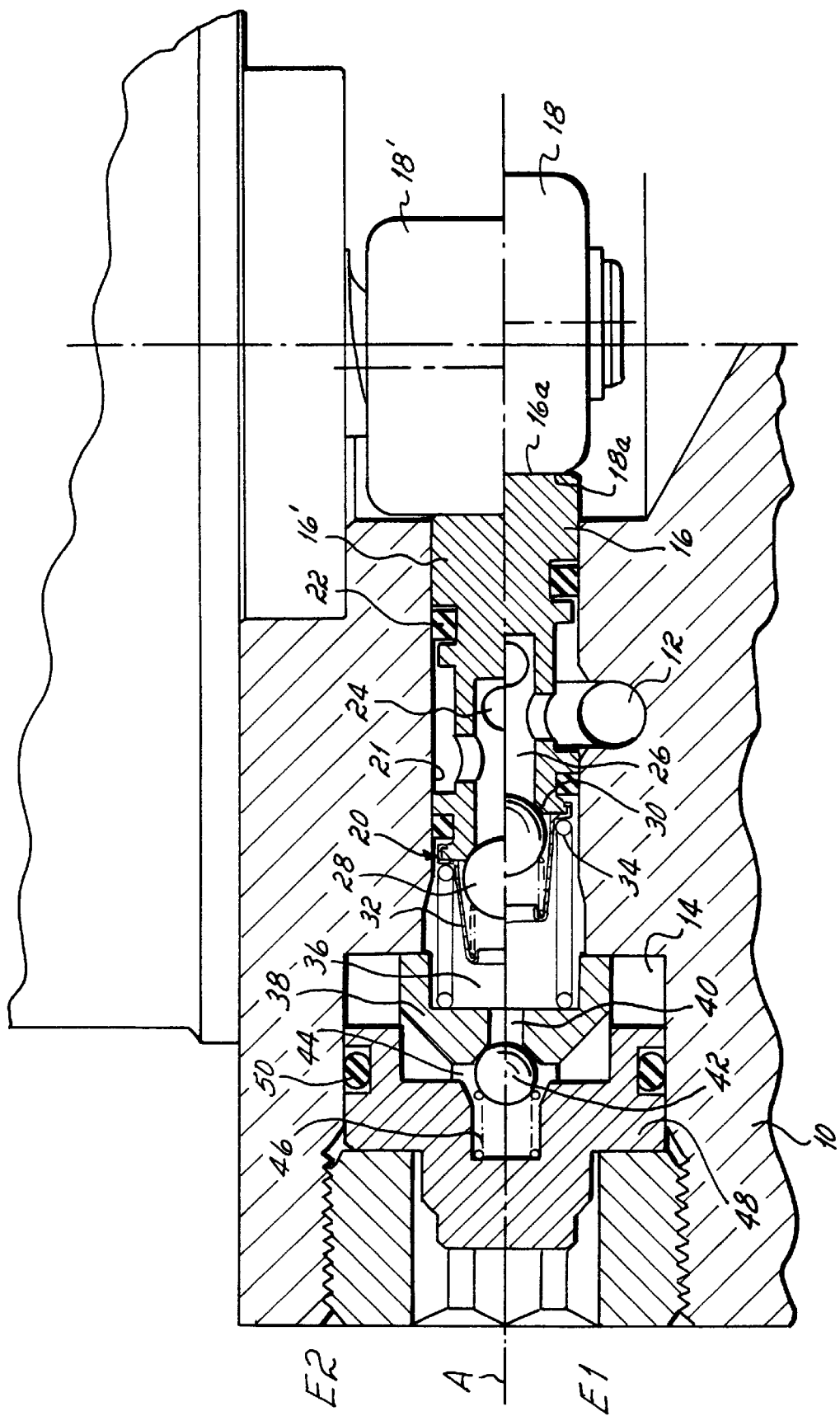
FIG. 1 is a schematic illustration of a piston pump in two different operating conditions.

According to FIG. 1, a piston pump comprises a housing 10 which forms the pump body. The purpose of the pump is to deliver hydraulic fluid in a vehicle braking system, particularly in an ABS and/or ASC braking system.

The hydraulic fluid reaches the housing 10 via an inlet 12 and is discharged from the housing 10 under pressure by means of the pump to a vehicle brake (not shown).

A piston 16 is supported in the housing 10 in such a manner that it is movable along the longitudinal axis A of the pump such that a sealing action is maintained. A drive 18 moves the piston 16 in the housing 10. In a known manner an eccentric serves as the drive 18, which presses against a face 16a of the piston 16 via a stop face 18a and thereby moves the piston to the left (in FIG. 1). FIG. 1 shows two different positions of the components. Below the longitudinal axis A of the piston pump, the piston 16 and the components which move together with it are illustrated in a first extreme position E1 in which the components are in their furthest right hand position in the drawing, while the components above the longitudinal axis A are in their furthest left hand second extreme position E2.

A valve assembly 20 is connected with the piston 16.

A seal is arranged between the piston 16 and a central hole 21 in the housing 10, in which the piston 16 is movably arranged.

Via the inlet 12 and a passage 24 the hydraulic fluid to be delivered reaches an inner chamber 26 which is formed in the piston 16. At the face end of the piston 16, when viewed in the direction of delivery, a valve seat is formed against which a ball 28 can be placed in an accurately fitting (sealing) manner.

A shaped sheet metal part 32 is attached at the piston 16. The shaped sheet metal part 32 and its fastening at the piston 16 will be explained later in a more detailed manner with reference to FIGS. 2 to 7.

A return spring 34 biases the piston 16 to the right (FIG. 1), i.e. towards the drive 18. The return spring 34 is positively engaged with the shaped sheet metal part 32 as will also be explained later in a more detailed manner with reference to FIGS. 6 and 7.

Downstream of the ball 28 which serves as a valve closing member a chamber 36 is formed in the housing 10 for accommodating hydraulic fluid. The shaped sheet metal part 32 is provided with passages (see also FIGS. 4 and 5) so that a permanent sliding connection between the interior of the shaped sheet metal part 32 and the chamber 36 is provided.

A valve body 38 is securely (unmovably) connected with the housing 10 and has a central channel 40 through which the hydraulic fluid can flow to the left in FIG. 1 (in the direction of delivery) if a ball 42 opens a seat at the outlet of the channel 40 against the force of a spring 46. The hydraulic fluid then flows via a channel 44 to an outlet 14.

An end piece 48 is also rigidly connected with the housing 10 and forms a cage for the spring 46. The flow path to the outlet 14 is sealed by means of a seal 50.

The piston pump according to FIG. 1 operates as a suction pump. In the extreme position E1 of the piston 16 as shown in FIG. 1 below the longitudinal axis A, hydraulic fluid is present in the inner chamber 26 of the piston. If the piston 16 is then moved by means of the drive 18 in a delivery stroke into the extreme position E2 (positions 18' of the drive or 16', respectively, of the piston) as shown in FIG. 1 above the longitudinal axis A, the ball 28 remains sealingly on the associated valve seat 30 and the hydraulic fluid in the chamber 36 is subjected to a high pressure due to the piston movement. This pressure moves the ball 42 against the force of the relatively weak spring 46 so that the hydraulic fluid flows to the outlet 14 via the passages 40, 44 and is thus supplied under high pressure to the vehicle brake. After the piston has reached the extreme position E2 as shown in FIG. 1 above the longitudinal axis A the eccentric drive returns into the extreme position E2 (this is the initial position) so that the piston 16 is forced to the right due to the relatively high biasing force of the return spring 34. In this case, the ball 42 is in sealing contact with its associated seat on the valve body 38. Upon movement of the piston 16 to the right in FIG. 1, the force of the spring 34 causes a vacuum in the chamber 36 (which is filled with hydraulic fluid) so that the ball 28 is lifted off the valve seat 30 and thus makes a flow connection for the hydraulic fluid between the inner chamber 26 and the chamber 36 (the shaped sheet metal part 32 is provided with openings as already explained above). Consequently, upon a movement of the piston 16 from the left to the right in FIG. 1, hydraulic fluid flows from between the ball 28 and the valve seat 30 into the chamber 36 which, with this movement, increases its volume. After the piston 16 has reached its extreme position E1 as shown in FIG. 1 below the longitudinal axis A, a new delivery working stroke of the piston begins due to a movement of the eccentric 18 to the left, as described above.

It becomes obvious from the above description that no sliding sleeve as an additional component is arranged between the piston 16 and the valve assembly 20 (which comprises at least the ball 28 with its seat 30 and the shaped sheet metal part 32) and the hole 21 in the housing 10.

For the assembly of the piston pump (and correspondingly for its disassembly) the piston 16 and the valve assembly 20 are connected to form an independently handable subassembly. This is described in more detail in FIGS. 2 to 7.

FIG. 2 shows the shaped sheet metal part 32 prior to its final shaping. It comprises three arms 52a, b, c. In lieu of these, four or more arms can be provided.

The arms of the shaped sheet metal part 32 end integrally in a bottom 54 in the centre of which an indentation 56 is provided (see also FIG. 3).

The free ends of each of the arms 52a, b, c are each provided with a hook 60a, b, c for securing the shaped sheet metal part 32 at the piston 16 (see also FIG. 6).

The shaped sheet metal part 32 according to FIG. 2 can be punched in a simple manner. The hooks 60a, b, c are made by bending the free ends of the arms 52a, b, c.

At a bending point 58 (see also FIGS. 3, 4) the arms 52a, b, c are bent in such a manner that the shaped sheet metal part 32 forms a cage according to FIGS. 4 and 6.

Due to the shaping of the shaped sheet metal part 32 as shown in FIGS. 4 and 6, a spring seat for a spring 66 which biases the ball 28 towards the valve seat 30 is formed at the bending point 58 by means of the indentation 56. The force of the spring 66 is designed in such a way that with the above described movement of the piston 16 the ball 28 is lifted off the valve seat 30 to the right in FIG. 1.

The fastening of the shaped sheet metal part 32 at the piston 16 is effected by means of the hooks 60a, b, c and a circumferential nose 64 of the piston 16. The piston 16 is sealingly guided in the hole 21 of the housing 10 by means of a seal 62.

As can be seen from FIGS. 6 and 7, the return spring 34 is slid onto the shaped sheet metal part 32 in such a manner that it can be positively secured there and be pulled off the shaped sheet metal part 32 only by the application of force. For this purpose the shaped sheet metal part 32 in its finished bent condition according to FIGS. 4 and 6 is formed in such a way that it is slightly conical and forms a retaining edge 68 which is located at such a distance from the hooks 60a, b, c at the free ends of the arms 52a, b, c that one end of the return spring 43 can be slid over the retaining edge 68 and engages elastically in a recess between the retaining edge 68 and the hooks 60 (see also FIG. 7) and thus enable the positive attachment of the return spring 34 at the shaped sheet metal part 32.

When assembling the piston pump according to FIG. 1, it is thus possible to fasten the valve assembly 20, which consists of the shaped sheet metal part 32, the spring 66 and the ball 28 by means of the hooks 60a, b, c, at the piston 16, and it is also possible to fasten the return spring 34 at the shaped sheet metal part 32 in the described manner. This does not require a sliding sleeve, and the assembly formed in this way with the components 16, 18, 66, 32 and 34 can be inserted as a whole into the housing 10 of the pump, with no special positioning of the housing (vertically or horizontally or the like) being required.

Figure 8:
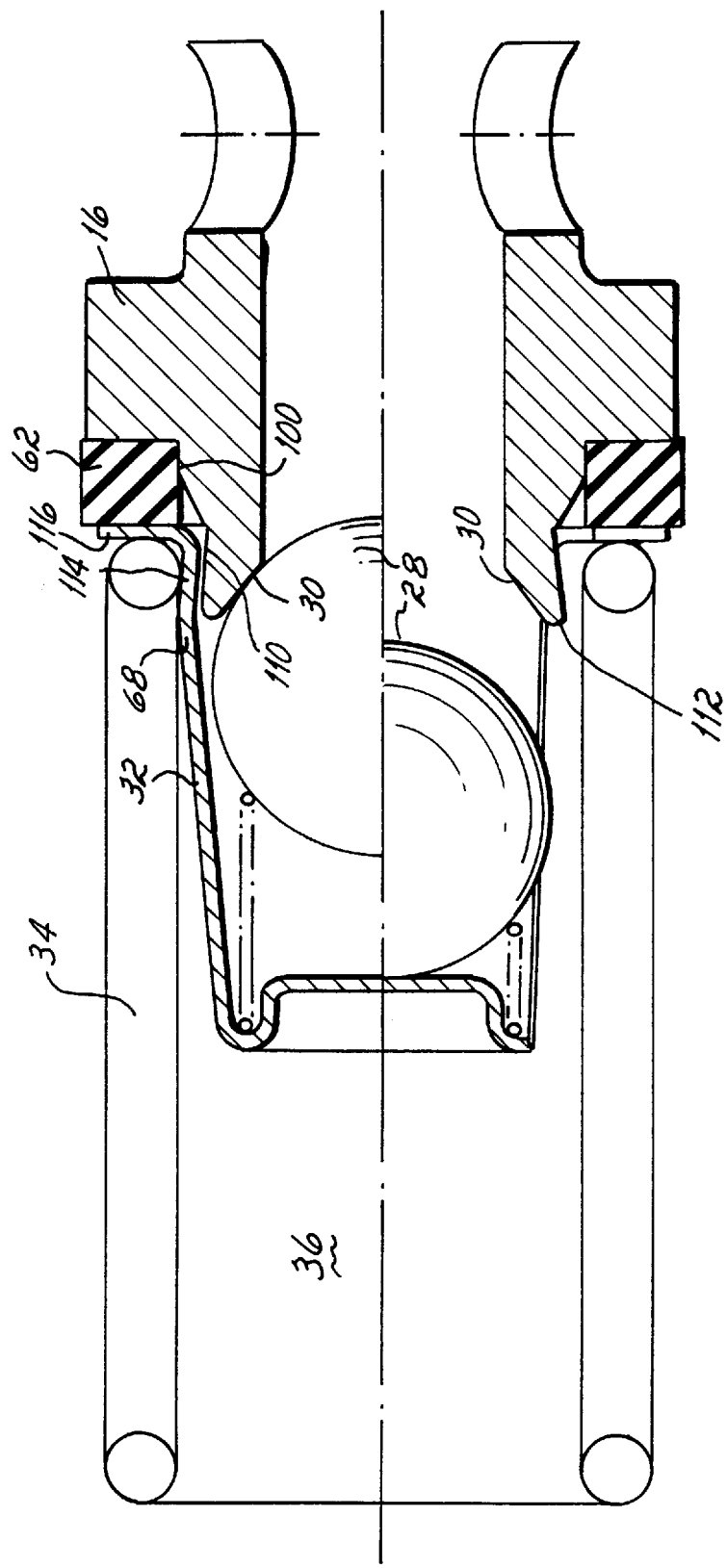
FIG. 8 shows an assembly of a piston pump according to FIG. 1 in two different operating conditions of the intake valve in a second embodiment.

FIG. 8 illustrates an assembly of a piston pump according to FIG. 1 in two different operating conditions of the intake valve in a second embodiment. Identical parts are given the same reference numerals as in FIG. 1, and in the following their detailed description is omitted.

The seal 62 serves to seal the piston 16 in the hole 21 of the housing 10 in a fluid-tight manner in order to ensure the pumping action of the piston pump. As a result of tolerances, the seal 62 can have both a radial and an axial clearance with respect to the piston 16. The seal 62 is accommodated in a shoulder 100 at the end of the piston facing the ball 28. In order to ensure maximum life and safe operation the seal 62 is preferably made from polytetrafluoroethylene material which enables a low-friction sealing seat in the hole 21, which may be anodized, if required. A seal made from this polytetrafluoroethylene material (PTFE), however, cannot provide for an elastic compensation of the radial clearance. The consequence of this can be that when the pump is running idle, i.e. with no fluid being supplied, a small fluid quantity will always remain in the chamber 36, which is compressed by the delivery stroke of the piston 16. This can result in an undesired noise.

As a result of assembly, the radial clearance preferably occurs between the piston 16 and the seal 62. In order to avoid this, the seal 62 is fixed on the shoulder 100 at the piston 16.

At the end of the piston 16 associated with the valve seat 30 the step-shaped shoulder 100 is provided for radially and axially locating the seal 62. At the outer circumference of the valve seat 30 a circumferential surface 110 which is recessed radially inward is formed which tapers relative to the foremost end 112 of the piston 16 at an angle of 5° to 35°. Thus, the front end 112 forms a circumferential retaining edge for the shaped sheet metal part 32. For connecting the shaped sheet metal part 32 positively with the piston 16 or for fastening the shaped sheet metal part 32 in a positive manner at the piston 16, the shaped sheet metal part 32 is provided with an inwardly angled portion 114 at its free end, the shape of which corresponds to the circumferential surface 110. The shaped sheet metal part 32 has outer ends 116 which project in a radially outward direction and which are designed in such a way that they urge the seal 62 in an axial direction into the shoulder 100 if the assembly shown in FIG. 8 is installed in the piston pump. This is ensured even in the pressureless condition by the action of the return spring 34.

Due to the fact that the seal 62 is biased on the shoulder 100, an additional sealing is generated which compensates any leakage caused by the radial clearance between the piston 16 and the seal 62.

For assembly, the seal 62 is slid onto the shoulder 100 at the piston. Subsequently the shaped sheet metal part 32 with the ball 28 located therein is slid over the retaining edge 120 so that the radially projecting ends 116 of the shaped sheet metal part 32 are in contact with the seal 62. Then the return spring 34 is slid onto the shaped sheet metal part 32 and engages the recess formed by the end of the shaped sheet metal part 32. In this case, the retaining edge 120 of the piston 16 is embraced in such a way that a positive connection between the shaped sheet metal part 32 and the piston 16 is ensured by the return spring. The shoulder 100 and the circumferential surface 110 at the piston 16 are dimensioned in such a way that the force of pressure of the return spring acts on the seal 62 via the elasticity of the free ends 116 of the shaped sheet metal part 32. Thus, the seal 62 is located on the piston 16 also in a radial direction. This ensures that no fluid remains in the chamber 36 with the pump running idle.

We claim:

1. A piston pump for delivering hydraulic fluid in a block-protected braking system of a vehicle, comprising
   a pump housing (10) with an inlet (12) for the admission of hydraulic fluid into the housing (10) and an outlet (14) through which the supplied hydraulic fluid leaves the housing (10);
   a piston (16) guided in a pump housing (10), which carries out working strokes in order to supply hydraulic fluid from the inlet (12) to the outlet (14);
   a valve assembly (20) in the delivery path of the hydraulic fluid through the housing (10);
   a drive (18) which moves the piston (16) through the housing (10) for the purpose of delivery; and
   a return spring (34) which biases the piston (16) towards the drive (18), characterized in that
   the piston (16), the return spring (34) and the valve assembly (2) being releasably joined as an independent assembly unit and located in the pump housing (10), the joined independent assembly unit capable of being retrieved from the housing (16) as a unit and handled independently.

2. A piston pump according to claim 1, characterized in that the joining of the assembly is effected by means of a part (32) of the valve assembly (20).

3. A piston pump according to one of claim 1, characterized in that the joining of the assembly is effected by means of a part (32) of the valve assembly (20).

4. A piston pump according to claim 3, characterized in that the shaped sheet metal part (32) can be fastened at the piston (16) by means of at least one hook (60).

5. A piston pump according to claim 3 or 4, characterized in that the shaped sheet meat part (32) is positively secured by the piston (16).

6. A piston pump according to claim 4, characterized in that the shaped sheet metal part (32) is positively secured by the piston (16).

7. A piston pump according to claim 3, characterized in that the part also serves as a spring cage for holding of at least one spring (34, 66).

8. A piston pump according to claim 3, characterized in that the part carries the return spring (34).

9. A piston pump according to claim 4, characterized in that the shaped sheet metal part (32) comprises several arms (52a, b, c), at least one of which is provided with a hook (60a, b, c) at its free end for fastening at the piston (16).

10. A piston pump according to claim 4, characterized in that the return spring (34) is positively secured by the shaped sheet metal part (32).

11. A piston pump according to claim 4, characterized in that the shaped sheet metal part (32) comprises a retaining edge (68) for positively securing the return spring (34).

12. A piston pump according to claim 1 characterized in that the piston (16) has at least one seal (62) at its circumference, which seals the piston (16) against a hole (21) of the housing (10).

13. A piston pump according to claim 11 or 12, characterized in that the shaped sheet metal part (32) comprises several arms (52a, b, c), at least one of which is angled in a radial direction at its free end.

14. A piston pump according to claim 12, characterized in that the shaped sheet metal part (32) comprises several arms (52a, b, c), at least one of which is angled in a radial direction at its free end.

* * * * *